United States Patent
Chen et al.

(10) Patent No.: US 12,154,044 B2
(45) Date of Patent: Nov. 26, 2024

(54) TRAINING METHOD FOR MULTI-OUTPUT LAND COVER CLASSIFICATION MODEL, CLASSIFICATION METHOD, AND DEVICE

(71) Applicant: China University of Geosciences, Wuhan, Wuhan (CN)

(72) Inventors: Weitao Chen, Wuhan (CN); Zhuang Tang, Wuhan (CN); Xianju Li, Wuhan (CN); Lizhe Wang, Wuhan (CN); Tian Tian, Wuhan (CN); Gang Chen, Wuhan (CN)

(73) Assignee: China University of Geosciences, Wuhan, Wuhan (CN)

( * ) Notice: Subject to any disclaimer, the term of this patent is extended or adjusted under 35 U.S.C. 154(b) by 1037 days.

(21) Appl. No.: 17/103,947

(22) Filed: Nov. 25, 2020

(65) Prior Publication Data
US 2022/0004912 A1    Jan. 6, 2022

(30) Foreign Application Priority Data
Jul. 1, 2020  (CN) .......................... 202010623009.3

(51) Int. Cl.
*G06V 10/82* (2022.01)
*G06N 7/08* (2006.01)
*G06V 10/764* (2022.01)
*G06V 20/13* (2022.01)
*G06V 20/40* (2022.01)

(52) U.S. Cl.
CPC ............. *G06N 7/08* (2013.01); *G06V 10/764* (2022.01); *G06V 10/82* (2022.01); *G06V 20/13* (2022.01); *G06V 20/41* (2022.01); *G06V 20/46* (2022.01)

(58) Field of Classification Search
CPC .............................. G06V 10/82; G06V 20/188
USPC .......................................................... 382/157
See application file for complete search history.

(56) References Cited

U.S. PATENT DOCUMENTS

| | | | |
|---|---|---|---|
| 2021/0097176 A1* | 4/2021 | Mathews | G06N 5/01 |
| 2021/0142110 A1* | 5/2021 | Tian | G06V 20/68 |

* cited by examiner

*Primary Examiner* — Ayodeji O Ayotunde
(74) *Attorney, Agent, or Firm* — Bayramoglu Law Offices LLC (57) ABSTRACT

A training method for multi-output land cover classification model and a classification method are provided. The training method includes: obtaining a training data; inputting the training data into an initial model based on deep belief nets for training to obtain a multi-output land cover classification model, wherein the initial model includes N level outputs, and the N level outputs include an output set at last network layer and (N−1) level output set at any (N−1) network layers from a first network layer to a penultimate network layer of the initial model; determining a total loss according to losses of the N level outputs; performing a backpropagation based on the total loss to adjust a parameter of the initial model, N being an integer greater than or equal to 2. The gradient is not easy to disappear during backpropagation of the model, which is beneficial to improve classification accuracy.

6 Claims, 3 Drawing Sheets

TRAINING METHOD FOR MULTI-OUTPUT LAND COVER CLASSIFICATION MODEL, CLASSIFICATION METHOD, AND DEVICE

BACKGROUND OF THE INVENTION

Field of the Invention

The present invention related to the technology field of remote sensing image classification, in particular, to a training method for multi-output land cover classification model, a classification method and a device.

Description of Related Art

In recent years, the ability to acquire high-resolution remote sensing images has increased rapidly, and remote sensing classification applications have become more and more extensive. Since Hinton et al. proposed the concept of deep learning in 2006, researchers have proposed numerous deep learning networks. Deep learning combines low-level features to form more abstract high-level features to represent attribute categories or high-level semantic features, which has made some progress in the field of remote sensing classification.

In the fine classification of land cover types, it is difficult for a shallower network to distinguish low-level categories of features, such as dry land and paddy fields in cultivated land, suggesting that the classification accuracy of the shallower network depth is difficult to meet the requirements, and only the deepening of the network structure can meet the demand. However, when the network structure is deep, the phenomenon of gradient disappearance may occur, which makes it difficult to adjust the parameters of the first few layers of the network, restricting the improvement of classification accuracy.

SUMMARY OF THE INVENTION

The problem solved by the present invention is the difficulty in adjusting the network parameters caused by gradient disappearance when the existing network structure is used to finely classify land cover types.

In order to solve the above-mentioned problem, a training method for multi-output land cover classification model is provided. The training method includes: obtaining a training data; and inputting the training data into an initial model based on deep belief nets for training to obtain a multi-output land cover classification model, wherein the initial model comprises N level outputs, and the N level outputs comprise an output set at the last network layer of the initial model and (N−1) level output set at any (N−1) network layers from a first network layer to a penultimate network layer of the initial model; determining a total loss according to losses of the N level outputs; performing a backpropagation based on the total loss to adjust a parameter of the initial model, N being an integer greater than or equal to 2.

The step of obtaining the training data includes: obtaining an image set for training; and performing a feature extraction on the image set to obtain the training data, wherein the extracted features comprise at least one of a band spectrum, a vegetation index, a principal component band, a multi-scale filtering feature, a multi-scale texture feature, and a terrain feature.

Further, the step of determining the total loss according to losses of the N level outputs includes: calculating a weighted sum of the losses of the N level outputs as the total loss according to weight coefficients corresponding to the losses of the N level outputs.

Further, N=2, and the initial model includes a first level output and a second level output. The step of determining the total loss according to the losses of the N level outputs includes: obtaining a first loss based on the first level output and a corresponding label, and obtaining a second loss based on the second level output and a corresponding label; and calculating the total loss based on the first loss, the second loss, and corresponding weight coefficients of the first loss and the second loss.

Further, the initial model has a plurality of models. The step of inputting the training data into the initial model based on deep belief nets for training to obtain a multi-output land cover classification model includes: inputting the training data into each of the initial models to train each of the initial models to obtain a trained classification model corresponding to each of the initial models, wherein the number of network layers where the (N−1) level output of each of the initial models is located is different from each other; and selecting the classification model with an optimal classification result from a plurality of the classification models as the multi-output land cover classification model.

Further, the initial model has a plurality of models, and the number of network layers where the (N−1) level output of each of the initial models is located is different from each other. The step of inputting the training data into an initial model based on deep belief nets for training to obtain a multi-output land cover classification model includes: inputting the training data into each of the initial models to train each of the initial models to obtain a trained classification model corresponding to each of the initial models, wherein the total loss on which each of the initial models is based during backpropagation is the losses based on the N level outputs of each of the initial models and the total loss obtained by a preset default weight coefficient corresponding to the loss of each level of output, and wherein the preset default weight coefficient corresponding to the loss of each level of output of each of the initial models is equal; selecting a first classification model with the optimal classification result from the plurality of the classification models; and inputting the training data into the first classification model for training to obtaining optimal weight coefficients corresponding to the loss of each level of output of the first classification model, and treating the first classification model with the optimal weight coefficients as the multi-output land cover classification model. The step of inputting the training data into the first classification model for training to obtain optimal weight coefficients corresponding to the loss of each level of output of the first classification model includes: traversing all possible weight coefficient combinations for training again to obtain a trained first classification model corresponding to all weight coefficient combinations based on the first classification model, wherein the weight coefficient combination comprised by the first classification model with the optimal classification result is the optimal weight coefficient.

Further, the step of inputting the training data into each of the initial models to train each of the initial models to obtain a trained classification model corresponding to each of the initial models includes: obtaining a plurality of weight coefficient combinations, inputting the training data into each of the initial models respectively for training into a trained classification model corresponding to each of the weight coefficient combinations under each of the initial models, and treating the classification model with an optimal classification effect under each of the initial models as a trained classification model corresponding to each of the initial models.

Further, the step of performing a feature extraction on the image set to obtain the training data includes: performing a feature extraction on the image set is to normalize the feature extracted from the image set to obtain the training data.

In another embodiment, a classification method is provided. The classification method includes: obtaining a feature data of a remote sensing image to be classified; and inputting the feature data of the remote sensing image to be classified into the multi-output land cover classification model, and determining a classification result of the remote sensing image to be classified based on an output of the multi-output land cover classification model, wherein the multi-output land cover classification model is obtained based on the above-mentioned training method for multi-output land cover classification model.

In another embodiment, a training device for multi-output land cover classification model is provided. The training device includes a processor and a computer-readable storage medium storing a computer program. When the computer program is executed by the processor, the abovementioned training method for multi-output land cover classification model is realized.

In another embodiment, a classification device is provided. The classification device includes a processor and a computer-readable storage medium storing a computer program. When the computer program is executed by the processor, the abovementioned classification method is realized.

In the present invention, through provision of a multi-output land cover classification model, a plurality of losses are obtained from the multi-level category output in the training process of the classification model, a total loss is obtained based on the plurality of losses, and a backpropagation is performed is based on the total loss; further, the learning conditions of the first few layers of the network may be taken into account when the backpropagation is performed; and then, if the parameters of the first few layers are learned more coarsely, the output loss of the first few layers will be larger, and the total loss calculated accordingly will be larger, so that the gradient will not be easy to disappear during the backpropagation, thereby realizing the accurate adjustment of the parameters of the first few layers of the network and improving the classification accuracy.

BRIEF DESCRIPTION OF THE DRAWINGS

Aspects of the present invention are best understood from the following detailed description when read with the accompanying figures. The exemplary embodiments of the present invention and the description thereof are used to explain the present invention, and do not constitute improper limitations on the preset invention. In the drawings.

DESCRIPTION OF THE PREFERRED EMBODIMENTS

In order to enable the above objects, features and advantages of the disclosure to be more apparent and easily understood, the specific embodiments of the disclosure will be further elaborated hereafter in connection with the drawings.

The present invention provides a training method for multi-output land cover classification model. The training method includes:

Step S10, a training data is obtained;

the training data optionally is a feature data extracted from a remote sensing image, wherein the remote sensing image includes a land.

Step S20, the training data is input into an initial model based on deep belief nets for training to obtain a multi-output land cover classification model, wherein the initial model comprises an N level output, and the N level output comprises an output set at the last network layer of the initial model and an (N−1) level output set at any (N−1) network layer from a first network layer to a penultimate network layer of the initial model; a total loss is determined according to a loss of the N level output; a backpropagation is performed based on the total loss to adjust a parameter of the initial model, N being an integer greater than or equal to 2.

Figure 2:
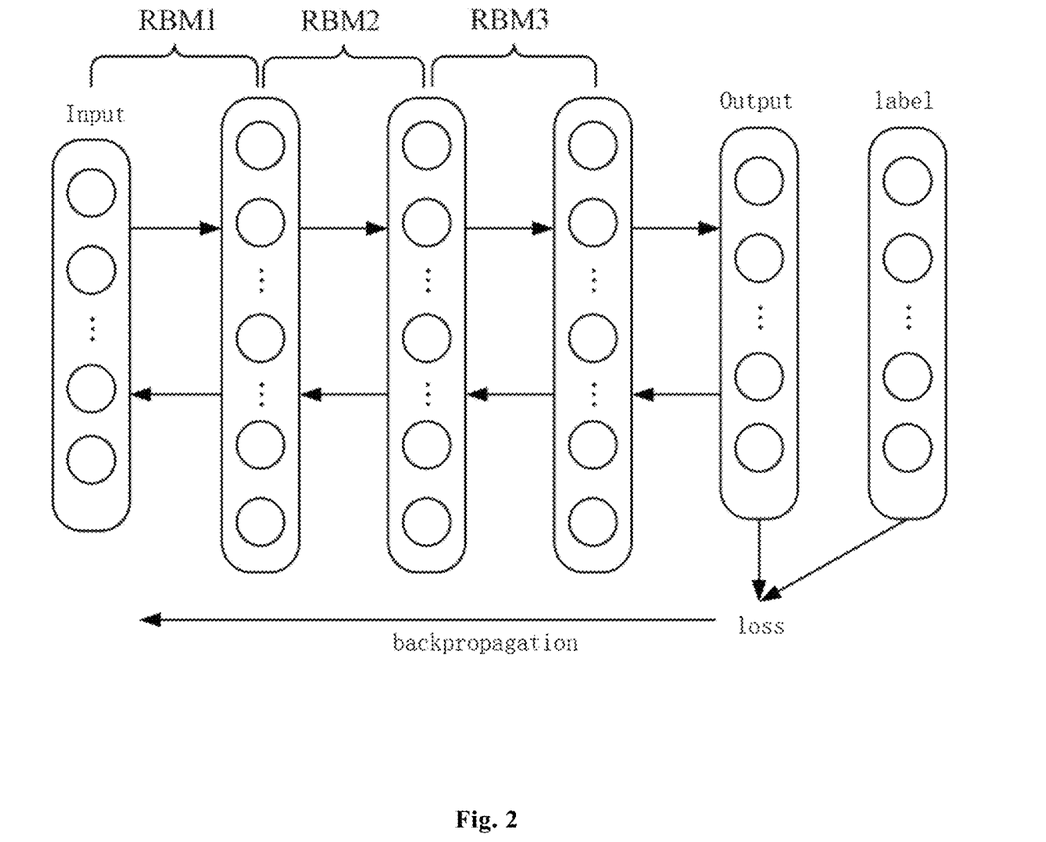
FIG. 2 is a view of DBN network structure (exemplified by 3 RBMs)

The initial model is Deep Belief Networks (DBN) with randomly initialized weight parameters. DBN is composed of multiple Restricted Boltzmann Machines (RBM) layers. The DBN network structure is shown in FIG. 2, and has main structural parameters of the number of RBM layers and the number of nodes per layer. Optionally, to simplify the process of adjusting parameters, the number of nodes in each layer of the DBN network structure of the initial model is the same. Optionally, a value range of the number of RBM layers (excluding the BP layer) in the DBN of the initial model is $\{1, 2, 3, 4, 5, 6\}$, and a value range of the number of nodes in each layer is $\{50, 100, 200, 500\}$.

DBN may train each layer of RBM network independently and unsupervisedly to ensure that as much feature information as possible is retained when feature vectors are mapped to different feature spaces, which the shortcomings of BP network that are easy to fall into local optimum and long training time due to random initialization of weight parameters.

Since the number of RBM layers and nodes in DBN are small, the model fitting ability is insufficient and the classification accuracy and classification effect are not good, DBN requires a certain network depth (more RBM layers and more nodes); however, when the DBN network is deep, the gradient disappears during the training process, which makes it difficult to adjust the parameters of the first few layers of the network, thereby restricting the further improvement of the classification accuracy.

To solve the above problem, the present invention constructs and trains a multi-output classification model based on a deep belief network, i.e., a multi-output land cover classification model. The model contains N (N≥2) level outputs, which are set in different network layers of the model, wherein one output is set in the last network layer of the model, and the other outputs are set in any (N−1) network layers between the first network layer and the penultimate network layer, and wherein the N level outputs have a multi-level classification relationship. For the multi-output land cover classification model, the deeper the network layer, the higher the classification accuracy; taking the two-level classification of land cover as an example, the first-level ground object category represents the high-level category of ground objects, and the second-level ground object category represents the low-level category of ground objects, e.g., the cultivated land is a first-level ground object category, and the second-level ground object category is subdivided into dry land, paddy field, etc., so that in the corresponding land cover classification model, the second-level ground object category output is set in the deeper network layer, and the first-level ground object category is set in the shallower network layer.

Figure 3:
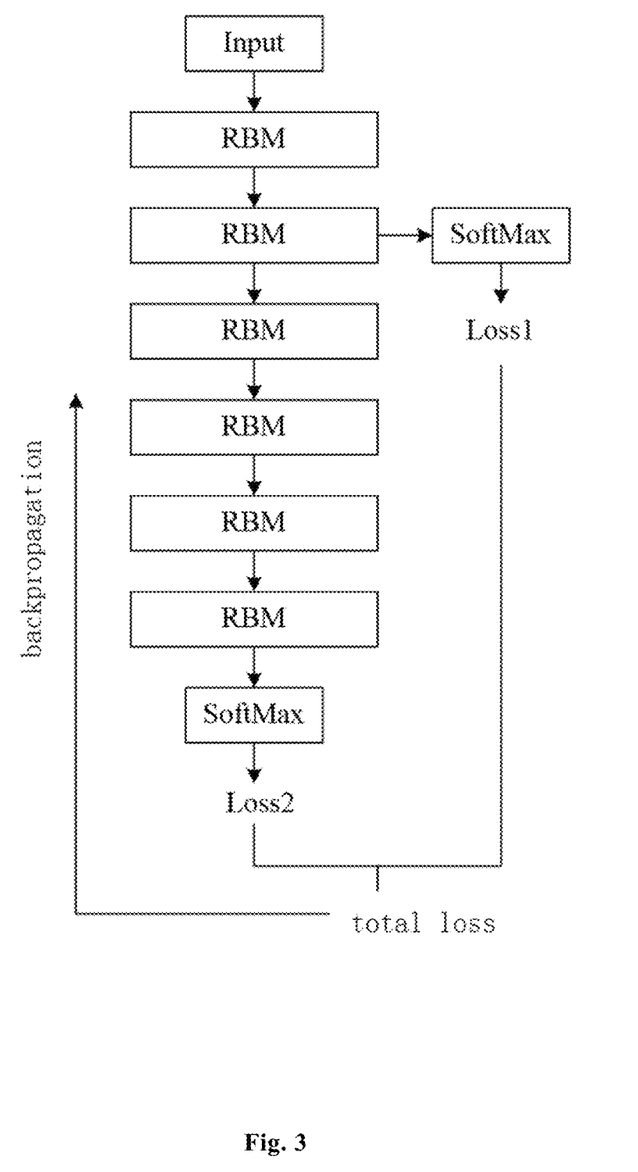
FIG. 3 is a view of an embodiment of another training method for multi-output land cover classification model according to the present invention.

In addition to the last layer, the output of other network layers that are provided with the output is not only used as the input of a classifier, but also as the input of the next network layer; for example, FIG. 3 shows a network structure having two level outputs, wherein RBM means a plurality of restricted Boltzmann machines, with one output set in the last layer and the other output set in the second layer RBM, and wherein the output of the second layer RBM is not only used as the input of the Softmax classifier, but also as the input of the third layer RBM, so as to determine the total loss ($Loss_{total}$) based on the loss 1 (Loss1) of the output set in the second layer RBM and the loss 2 (Loss2) of the output set in the last layer and to apply the total loss to backpropagation, thereby adjusting the network parameters of the model shown in FIG. 3.

In the training process of the above multi-output land cover classification model, the plurality of losses are obtained by the multi-level category outputs, and the total loss is obtained based on the plurality of losses, wherein each of the losses is positively correlated with the total loss. For example, the total loss is obtained by the weighted sum of the plurality of losses, or the total loss is obtained by the sum of the plurality of losses. A backpropagation is performed is based on the total loss. Further, the learning conditions of the first few layers of the network may be taken into account when the backpropagation is performed; and then, if the parameters of the first few layers are learned more coarsely, the output loss of the first few layers will be larger, and the total loss calculated accordingly will be larger, so that the gradient will not be easy to disappear during the backpropagation, thereby realizing the accurate adjustment of the parameters of the first few layers of the network and improving the classification accuracy.

Optionally, when N=2, the initial model comprises a first level output and a second level output; the determining a total loss according to the losses of the N level outputs includes: a first loss is obtained based on the first level output and a corresponding label, and a second loss is obtained based on the second level output and a corresponding label; a total loss is calculated based on the first loss, the second loss, and corresponding weight coefficients of the first loss and the second loss.

Figure 1:
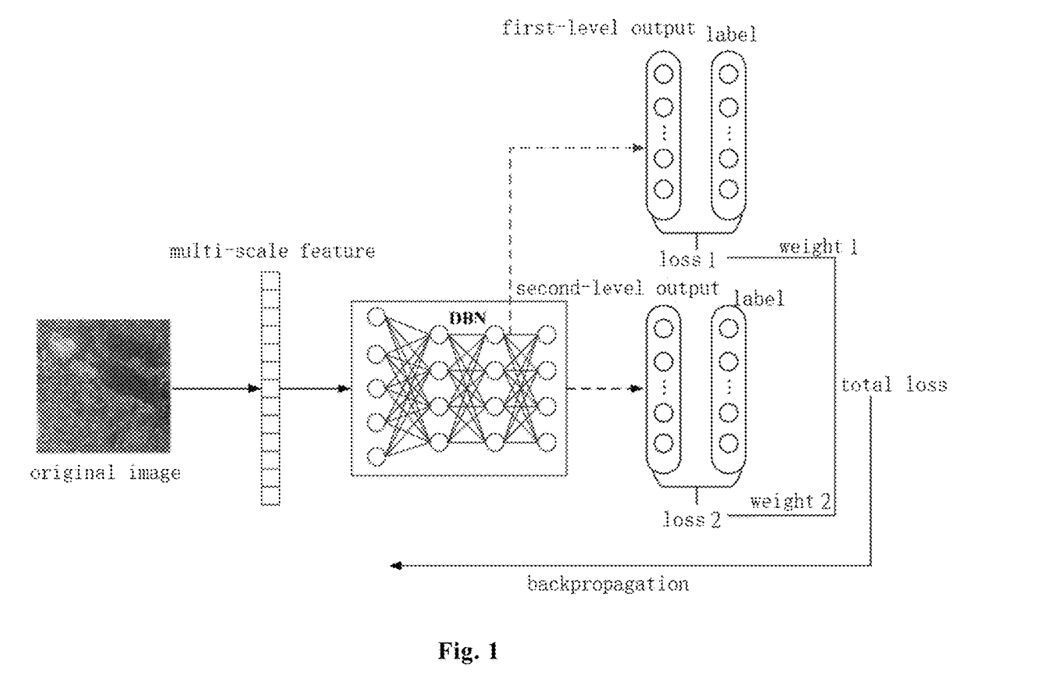
FIG. 1 is a view of an embodiment of a training method for multi-output land cover classification model according to the present invention.

As shown in FIG. 1, when N=2, the multi-output land cover classification model may output two-level classification, with the output set at the last layer as a second-level classification (i.e., the second level output mentioned above) and the output of one layer from the first layer to the penultimate layer as a first-level classification (i.e., the first level output mentioned above), wherein the classification accuracy of the first-level classification is less than that of the second-level classification.

The loss of each of the outputs is calculated based on each of the outputs and the corresponding labels of the outputs, and two outputs will result in two losses. Optionally, the total loss during backpropagation is the weighted sum of the losses of two outputs. In an embodiment, if the initial model or the multi-output land cover classification model is a land cover classification model with the second-level output, then the first-level classification is a high-level category of ground objects, such as cultivated land, forest, etc., and the second-level classification is the low-level category of ground objects, such as dry land and paddy field in cultivated land.

Through provision of two outputs, in which one of the outputs is set in the previous layers of the network (the first layer to the penultimate layer) to introduce the losses of the previous layers into the backpropagation such that the backpropagation may take into account the learning status of the parameters of the previous layers of the network; when the learning of the parameters of the previous layers is rough, the output losses of the previous layers will be larger, and the total loss will also increase after weighting accordingly, so that the phenomenon of gradient disappearance is not easy to occur in the backpropagation and the network parameters of the previous layers are adjusted accordingly, thereby improving the classification accuracy.

Optionally, the initial model has a plurality of models, and the Step S20 includes:

Step S200, the training data is input into each of the initial models to train each of the initial models to obtain a trained classification model corresponding to each of the initial models, wherein the number of network layers where the (N−1) level output of each of the initial models is located is different from each other;

the number of network layers where the (N−1) level output of each of the initial models is located is different, i.e., each of the initial models has a different output location; for example, for the initial model with 6 layers of RBM with two outputs, one output is set in the last layer (i.e., the sixth layer), then the other outputs traverse the first to fifth layers to obtain 5 initial models, wherein the other output of the first initial model is set in the first layer, the other output of the second initial model is set in the second layer, the other output of the third initial model is set in the third layer, the other output of the fourth initial model is set in the fourth layer, and the other output of the fifth initial model is set in the fifth layer.

Due to different settings for output locations, it is possible to train classification models with different classification effects. In order to train a multi-output land cover classification model with the best classification effect, the plurality of initial models with different output locations are trained. For example, the initial model is a 6-layer network structure with three outputs; one output is set in the last layer (i.e., the sixth layer), then the other two outputs traverse the first to fifth layers to obtain 10 initial models; [a, b] is used to indicate where the other two outputs are set in the model, indicating that one of the other two outputs is in layer a and the other is in layer b, then the settings of the other two outputs in the 10 initial models are distributed as follows:

[1, 2], [1, 3], [1, 4], [1, 5], [2, 3], [2, 4], [2, 5], [3, 4], [3, 5], [4, 5].

Each of the initial models corresponds to the trained classification model and has the same output location as the initial model. The classification model with the optimal classification result is the classification model with the optimal output location.

Step S201, the classification model with an optimal classification result is selected from a plurality of the classification models as the multi-output land cover classification model.

The classification model with an optimal classification result is selected from a plurality of the classification models as the multi-output land cover classification model. Specifically, a verification data is obtained, and the verification data is input into a plurality of the classification models to obtain the verification result of each of the classification models;

each of the classification models is evaluated based on the verification result of each of the classification models; an optimal classification model determined based on the evaluation result of each of the classification models is the multi-output land cover classification model.

One or more of the total accuracy, Kappa coefficient and F1-Score of each of the classification models may be calculated based on the verification result of each of the classification models, and the optimal classification model is selected from the plurality of classification models as the multi-output land cover classification model based on one or more of the total accuracy of each classification model, Kappa coefficient and F1-Score.

Optionally, the determining a total loss according to the losses of the N level outputs includes: a weighted sum of the losses of the N level outputs is calculated as the total loss according to weight coefficients corresponding to the losses of the N level outputs.

The sum of the weight coefficients corresponding to the N level outputs is equal to 1, and a value range of each of the weight coefficients is (0, 1).

The weight coefficient represents the contribution of the corresponding output to the total loss, which in turn will affect the model training process and the classification effect of the trained model. Optionally, the weight coefficient of each output is a preset fixed weight value.

Optionally, the weight coefficient of each output is obtained by training based on the training data.

In an embodiment, the initial model has one model, then the training data is input into this initial model for training; in order to simplify the parameter adjustment process, the value of each of the weight coefficients may start from 0.1, with 0.1 as the step size, to 0.9. During above process, with the sum of the weight coefficients of the N level outputs being equal to 1 and the value range of each of the weight coefficients being (0,1) as the constraint principle, the two-level output model is taken as an example, wherein w1 is the weight coefficient of the first-level category output, and w2 is the weight coefficient of the second-level category output, then there may be 9 combinations of weight coefficients (w1, w2): (0.1, 0.9), (0.2, 0.8), (0.3, 0.7), (0.4, 0.6), (0.5, 0.5), (0.6, 0.4), (0.7, 0.3), (0.8, 0.2), (0.9, 0.1); the models under the above 9 weight coefficient combinations are trained until the loss function converges to obtain the trained models corresponding to the 9 weight coefficient combinations, and then an optimal model is selected from the trained models corresponding to the 9 weight coefficient combinations as the multi-output land cover classification model.

In another embodiment, the initial model has a plurality of models, and the number of network layers where the (N−1) level output of each of the initial models is located is different from each other, the step S20 including:

Step S210, the training data is input into each of the initial models to train each of the initial models to obtain a trained classification model corresponding to each of the initial models, wherein the total loss on which each of the initial models is based during backpropagation is the losses based on the N level outputs of each of the initial models and the total loss obtained by a preset default weight coefficient corresponding to the loss of each level of output, and wherein the preset default weight coefficient corresponding to the loss of each level of output of each of the initial models is equal;

Step S211, a first classification model with the optimal classification result i selected from the plurality of the classification models;

Step S212, The training data is input into the first classification model for training to obtaining optimal weight coefficients corresponding to the loss of each level of output of the first classification model, and the first classification model with the optimal weight coefficients is treated as the multi-output land cover classification model.

The preset default weight coefficient is a fixed weight coefficient, and the preset default weight coefficient corresponding to the loss of each level of output of each of the initial models is equal; each of the initial models is trained with the preset default weight coefficient, then the classification model with the optimal classification result is selected from the trained classification models (for ease of description, it is called the first classification model), and the output location setting of the first classification model is considered to be the optimal output location. On the above basis, the weight coefficient settings of each output is further adjusted to obtain the optimal classification model with the optimal output location and the optimal weight coefficient.

The optimal weight coefficients corresponding to the losses of each level of output include a plurality of weight coefficients, i.e., a weight coefficient combination.

Take a model with two-level output as an example, the initial model has 5 models, wherein w1 is the weight coefficient of the first-level category output, w2 is the weight coefficient of the second-level category output, and the preset default weight coefficient is (w1=0.5, w2=0.5), then (w1=0.5, w2=0.5) is applied to the training of 5 initial models to obtain an optimal first classification model. For example, for the first classification model, in addition to the output set in the last network layer, the other output is set in the second network layer Then, based on the first classification model, all other possible weight coefficient combinations are traversed for training again, with possible weight coefficient combinations of (0.1, 0.9), (0.2, 0.8), (0.3, 0.7), (0.4, 0.6), (0.6, 0.4), (0.7, 0.3), (0.8, 0.2), (0.9, 0.1), to obtain the trained first classification model corresponding to all weight coefficient combinations, wherein the weight coefficient combination contained in the first classification model with the optimal classification result is the optimal output weight coefficient.

The training speed is accelerated while obtaining a certain high-precision classification model by first setting the default weight coefficient, determining the model with the optimal classification result from the models with different output location settings, further rapidly selecting the optimal output location, and obtaining the optimal output weight coefficient based on the training on the model with the optimal output location to finally obtain the multi-output land cover classification model.

In a still another embodiment, the initial model has a plurality of models, and the Step S200 includes: a plurality of weight coefficient combinations are obtained, the training data is input into each of the initial models respectively for training into a trained classification model corresponding to each of the weight coefficient combinations under each of the initial models, and the classification model with an optimal classification effect under each of the initial models is treated as a trained classification model corresponding to each of the initial models.

The weight coefficient combination is the optimal weight coefficient corresponding to the loss of each level of output of a model.

Obtaining the plurality of weight coefficient combinations is to determine the possible combinations based on the value range of the weight coefficient. In order to simplify the parameter adjustment process, the value of each of the weight coefficients may be

{0.1, 0.2, 0.3, 0.4, 0.5, 0.6, 0.7, 0.8, 0.9}.

During the process, the sum of the weight coefficients of the N level outputs being equal to 1 and a value range of each of the weight coefficients being (0, 1) is considered as the restricting rule. For example, taking a mode with two-level outputs as an example, w1 is the weight coefficient of the first-level category output, and w2 is the weight coefficient of the second-level category output, then the weight coefficient combination (w1, w2) may have the following 9 values: (0.1, 0.9), (0.2, 0.8), (0.3, 0.7), (0.4, 0.6), (0.5, 0.5), (0.6, 0.4), (0.7, 0.3), (0.8, 0.2), (0.9, 0.1).

For each of the initial models, the classification model corresponding to each of the weight coefficient combinations is trained; taking the example in the previous paragraph as an example, there are 9 possible weight coefficient combinations for each of the initial models, then 9 models corresponding to the 9 weight coefficient combinations are trained. And then, the optimal classification model is selected from the classification models corresponding to each of the weight coefficient combinations as the trained classification model corresponding to each of the initial models.

Models with different output locations may have different optimal weight coefficients; for example, for a model with two-level outputs, w1 is the weight coefficient of the first-level category output, w2 is the weight coefficient of the second-level category output, wherein the optimal weight coefficient combination of the model with the output of the first level category output set in the second layer may be (w1=0.4, w2=0.6), and the optimal weight coefficient combination of the model with the output of the first level category output set in the third layer may be (w1=0.5, w2=0.5). By directly training the optimal weight coefficients under the same output location when each of the initial models is trained, and then selecting the model with the optimal classification result from the classification models with the optimal weight coefficients and different output locations as the multi-output land cover classification model, the finally selected multi-output land cover classification model may be ensured to be the optimal classification model.

Optionally, the Step S10 includes:

Step S11, an image set for training is obtained;

Step S12, a feature extraction is performed on the image set, wherein the extracted features comprise at least one of a band spectrum, a vegetation index, a principal component band, a multi-scale filtering feature, a multi-scale texture feature, and a terrain feature.

High-resolution remote sensing images have rich feature information. When classifying, selecting a variety of feature combinations may describe the differences of features from multiple angles and improve classification accuracy. In the multi-output land cover classification model of the present invention, the input features include but are not limited to the above 6 types.

In an embodiment, 106-dimensional features in 6 aspects including a band spectrum, a vegetation index, a principal component band, a multi-scale filtering feature, a multi-scale texture feature and a terrain feature are extracted, specifically as shown in the table below:

| Image feature | Feature name | Quantity |
| --- | --- | --- |
| Band spectrum | r, g, b, n band values | 4 |
| Vegetation index | NDVI | 1 |
| PC band | PC1, PC2 | 2 |
| Filtering feature | Gaussian low-pass filter*(r, g, b, n)*(3, 5, 7) | 12 |
| | Mean low-pass filter*(r, g, b, n)*(3, 5, 7) | 12 |
| | Standard deviation filter*(r, g, b, n)*(3, 5, 7) | 12 |
| Texture feature | Con, Cor, Asm, Ent, Hom*(r, g, b, n)*(3, 5, 7) | 60 |
| Terrain feature | DTM band, slope, aspect | 3 | wherein r, g, b, n represent red, green, blue, and near infrared bands respectively; (3, 5, 7) means that the extraction size is 3×3, 5×5, 7×7; Con, Cor, Asm, Ent, Hom respectively represent contrast, correlation, angular second moment, entropy, and homogeneity; NDVI refers to the vegetation coverage index; PC (Principal component, PC) band, namely the principal component band, is obtained through principal component analysis technology, wherein PC1 and PC2 are the first principal component and the second principal component respectively; DTM band is the digital terrain model band.

Step S13, the feature extracted from the image set is normalized to obtain the training data.

With the training data as the source data, a normalization function is constructed, and verification data and verification data are normalized, to adapt the input of the subsequent neural network model, thereby improving the convergence speed and robustness during training.

Optionally, the Z-score standardization method is used to normalize the extracted features. The specific method for Z-score standardization is:

$$x = \frac{x - \mu}{\sigma},$$

wherein $\mu$ is the mean of the sample data, and $\sigma$ is the standard deviation of the sample data.

The present invention further provides a classification method, including:

a feature data of a remote sensing image to be classified is obtained; the feature data of the remote sensing image to be classified is input into the multi-output land cover classification model, and a classification result of the remote sensing image to be classified is determined based on an output of the multi-output land cover classification model, wherein the multi-output land cover classification model is obtained by training based on the training method for multi-output land cover classification model mentioned above.

The feature data of the remote sensing image to be classified may be extracted from other equipment or different devices of the same equipment, and the extracted features are stored in a preset database for acquisition when the classification method is executed.

The feature data of the remote sensing image to be classified has specific feature types consistent with the training data; for example, when the training data includes 106-dimensional features in 6 aspects including a band spectrum, a vegetation index, a principal component band, a multi-scale filtering feature, a multi-scale texture feature and a terrain feature, the feature data of the remote sensing image to be classified actually used for classification also includes 106-dimensional features in 6 aspects mentioned above.

The feature data of the remote sensing image to be classified is input into the multi-output land cover classification model, and the multi-output land cover classification model outputs the classification results of the remote sensing images to be classified, specifically including the multi-level classification results of the land cover of the remote sensing images to be classified.

The multi-output land cover classification model trained based on the above-mentioned training method for multi-output land cover classification model is used to classify remote sensing images; since the gradient disappearance is not easy to occur in the training process, the parameters of each layer of the model may be adjusted accordingly in backpropagation, so that the model has a higher classification accuracy, which in turn enables the above classification method to obtain a better classification effect.

The present invention further provides a classification device, including: a processor and a computer readable storage medium storing computer programs, which, when executed by the processor, realized the classification method as described above. The relevant explanation of the classification device is basically the same as the above classification method. For details, please refer to the explanation of the above classification method, which will not be repeated here.

The present invention further provides a training device for multi-output land cover classification model, including: a processor and a computer readable storage medium storing computer programs, which, when executed by the processor, realized the training method for multi-output land cover classification model as described above. The relevant explanation of the training method of the multi-output land cover classification model has been explained above, and will not be repeated here.

Although the present invention is disclosed as described above, the protection scope of the disclosure is not limited to this. Those skilled in the art can make various changes and modifications without departing from the spirit and scope of the present invention, and these changes and modifications will fall within the protection scope of the present invention.

What is claimed is:

1. A training method for multi-output land cover classification model, comprising:
   obtaining a training data;
   inputting the training data into an initial model based on deep belief nets for training to obtain a multi-output land cover classification model, wherein the initial model comprises N level outputs, and the N level outputs comprise an output set at the last network layer of the initial model and (N−1) level output set at any (N−1) network layers from a first network layer to a penultimate network layer of the initial model; determining a total loss according to losses of the N level outputs; performing a backpropagation based on the total loss to adjust a parameter of the initial model;
   wherein the step of obtaining the training data comprises:
      obtaining an image set for training;
      performing a feature extraction on the image set to obtain the training data, wherein the extracted features comprise at least one of a band spectrum, a vegetation index, a principal component band, a multi-scale filtering feature, a multi-scale texture feature, and a terrain feature;
   wherein N=2, and the initial model comprises a first level output and a second level output; the step of determining the total loss according to the losses of the N level outputs comprises:
      obtaining a first loss based on the first level output and a corresponding label, and obtaining a second loss based on the second level output and a corresponding label; and
      calculating the total loss based on the first loss, the second loss, and corresponding weight coefficients of the first loss and the second loss.

2. The training method for multi-output land cover classification model according to claim 1, wherein the step of determining the total loss according to losses of the N level outputs comprise:
   calculating a weighted sum of the losses of the N level outputs as the total loss according to weight coefficients corresponding to the losses of the N level outputs.

3. The training method for multi-output land cover classification model according to claim 1, wherein the initial model has a plurality of models, and the step of inputting the training data into the initial model based on deep belief nets for training to obtain a multi-output land cover classification model comprises:
   inputting the training data into each of the initial models to train each of the initial models to obtain a trained classification model corresponding to each of the initial models, wherein the number of network layers where the (N−1) level output of each of the initial models is located is different from each other; and
   selecting the classification model with an optimal classification result from a plurality of the classification models as the multi-output land cover classification model.

4. The training method for multi-output land cover classification model according to claim 2, wherein the initial model has a plurality of models, and the number of network layers where the (N−1) level output of each of the initial models is located is different from each other; the step of inputting the training data into an initial model based on deep belief nets for training to obtain a multi-output land cover classification model comprises:
   inputting the training data into each of the initial models to train each of the initial models to obtain a trained classification model corresponding to each of the initial models, wherein the total loss on which each of the initial models is based during backpropagation is the losses based on the N level outputs of each of the initial models and the total loss obtained by a preset default weight coefficient corresponding to the loss of each level of output, and wherein the preset default weight coefficient corresponding to the loss of each level of output of each of the initial models is equal;
   selecting a first classification model with the optimal classification result from the plurality of the classification models; and
   inputting the training data into the first classification model for training to obtaining optimal weight coefficients corresponding to the loss of each level of output of the first classification model, and treating the first classification model with the optimal weight coefficients as the multi-output land cover classification model;
   wherein the step of inputting the training data into the first classification model for training to obtain optimal weight coefficients corresponding to the loss of each level of output of the first classification model comprises:
      traversing all possible weight coefficient combinations for training again to obtain a trained first classification model corresponding to all weight coefficient combinations based on the first classification model, wherein the weight coefficient combination comprised by the first classification model with the optimal classification result is the optimal weight coefficient.

5. The training method for multi-output land cover classification model according to claim 3, wherein the step of inputting the training data into each of the initial models to train each of the initial models to obtain a trained classification model corresponding to each of the initial models comprises:

obtaining a plurality of weight coefficient combinations, inputting the training data into each of the initial models respectively for training into a trained classification model corresponding to each of the weight coefficient combinations under each of the initial models, and treating the classification model with an optimal classification effect under each of the initial models as a trained classification model corresponding to each of the initial models.

6. The training method for multi-output land cover classification model according to claim 1, wherein the step of performing a feature extraction on the image set to obtain the training data comprises:

performing a feature extraction on the image set is to normalize the feature extracted from the image set to obtain the training data.

\* \* \* \* \*